US006243483B1

(12) United States Patent
Petrou et al.

(10) Patent No.: US 6,243,483 B1
(45) Date of Patent: Jun. 5, 2001

(54) MAPPING SYSTEM FOR THE INTEGRATION AND GRAPHICAL DISPLAY OF PIPELINE INFORMATION THAT ENABLES AUTOMATED PIPELINE SURVEILLANCE

(75) Inventors: Maria Petrou, Guildford; Andy J. Fraser, Sunderland; Brian Hewitt, Gosforth; Alan Tuck, Cramlington, all of (GB)

(73) Assignee: PII North America, Inc., Houston, TX (US)

(*) Notice: Subject to any disclaimer, the term of this patent is extended or adjusted under 35 U.S.C. 154(b) by 0 days.

(21) Appl. No.: 09/159,381

(22) Filed: Sep. 23, 1998

(51) Int. Cl.[7] .................................................. G06K 9/00
(52) U.S. Cl. ........................................... 382/103; 348/144
(58) Field of Search ................................... 382/100, 106, 382/109, 113, 141, 218, 284, 294, 103, 152, 181, 190, 202, 260, 291, 303, 307; 73/865.8, 592; 348/82, 84, 144; 356/51, 139.01, 397, 247; 378/58, 59; 405/174, 184; 250/330, 334; 701/213; 345/113; 396/9; 244/158 R, 159

(56) References Cited

U.S. PATENT DOCUMENTS

| 3,238,448 | 3/1966 | Wood et al. ............................ 324/220 |
| 3,769,711 | 11/1973 | Flournoy et al. ....................... 33/777 |
| 4,298,280 | 11/1981 | Harney ................................... 356/5 |
| 4,491,018 | 1/1985 | Stringer et al. ..................... 73/865.8 |
| 4,524,526 | 6/1985 | Levine .................................. 33/312 |
| 4,609,869 | 9/1986 | Metcalf ................................. 324/207 |
| 4,799,391 | 1/1989 | Lara .................................... 73/865.8 |
| 4,825,711 | 5/1989 | Jensen et al. ........................ 73/865.8 |
| 4,945,775 | 8/1990 | Adams et al. ....................... 73/865.8 |

(List continued on next page.)

OTHER PUBLICATIONS

Soreide et al. ("Information Processing in Marine Archaeology") IEEE 1996, pp. 680–687.*

Sury et al. ("Contribution of Satellite Data to Meteo–Oceanic Site Characterization: A case Study"), IEEE 1994, pp. I–515–I–521.*

PCT International Search Report dated Feb. 9, 2000 (4 pages).

Gas Pipeline Technological Research Gives Lower Costs and Greater Security, The Institute of Petroleum, Petroleum Review Apr. 1987, pp. 17, 19, 21, 22.

Clever Pig Roots Through Pipes, The Institute of Petroleum, Petroleum Review Nov. 1989, p. 557.

Pipeline Safety and Leak Detection, PD–vol. 19, The American Society of Mechanical Engineers, A Review of In–Line Inspection Capabilities, J.F. Kiefner, et al., pp. 29–40.

Inspection Pig Systems for Offshore Pipeline, Nippon Kokan Technical Report, Overseas No. 39 (1983), pp. 113–119.

Defect Location and Sizing in a Transmission Pipeline is No Easy Task, vol. 88, May 7, 1990.

(List continued on next page.)

Primary Examiner—Jayanti K. Patel
(74) Attorney, Agent, or Firm—Akin, Gump, Strauss, Hauer & Feld, LLP

(57) ABSTRACT

Pipeline data and satellite data are used to provide surveillance for a pipeline. The satellite data is integrated with the pipeline data to produce a current pipeline map. The current pipeline map is then compared with a previous pipeline map to determine whether the route of the pipeline or a surrounding environment of the pipeline has changed. The satellite data includes very high resolution (VHR) satellite imagery and the pipeline data includes location data that is a series of global positioning system (GPS) coordinates.

24 Claims, 4 Drawing Sheets

U.S. PATENT DOCUMENTS

| | | | |
|---|---|---|---|
| 4,970,682 | * | 11/1990 | Beckwith, Jr. et al. .......... 340/925.1 |
| 5,166,789 | * | 11/1992 | Myrick ................................. 348/144 |
| 5,247,356 | * | 9/1993 | Ciampa ................................ 348/144 |
| 5,323,317 | * | 6/1994 | Hampton et al. ....................... 702/3 |
| 5,329,595 | * | 7/1994 | Davies ................................. 382/103 |
| 5,331,578 | | 7/1994 | Stieler ................................... 702/93 |
| 5,414,462 | * | 5/1995 | Veatch ................................. 348/135 |
| 5,565,633 | | 10/1996 | Wernicke ........................... 73/865.8 |
| 5,596,494 | * | 1/1997 | Kuo ......................................... 702/2 |
| 5,631,970 | * | 5/1997 | Hsu ..................................... 382/113 |
| 5,659,142 | | 8/1997 | Lima et al. ......................... 73/865.8 |
| 5,719,949 | * | 2/1998 | Koeln et al. ........................ 382/113 |
| 5,731,997 | * | 3/1998 | Manson et al. ..................... 702/150 |
| 5,739,420 | | 4/1998 | Peterson ............................. 73/40.5 |
| 5,742,053 | * | 4/1998 | Rekunyk ........................... 250/338.5 |
| 5,752,513 | | 5/1998 | Acker et al. ......................... 600/424 |
| 5,848,373 | * | 12/1998 | DeLorme et al. .................. 701/200 |
| 5,870,314 | * | 2/1999 | Bosch .................................. 324/512 |
| 5,878,356 | * | 3/1999 | Garrot, Jr. et al. ...................... 701/1 |
| 5,883,584 | * | 3/1999 | Langemann et al. ........... 340/870.01 |
| 5,999,211 | * | 12/1999 | Hedges et al. ...................... 348/144 |
| 5,999,662 | * | 12/1999 | Burt et al. ........................... 382/284 |

OTHER PUBLICATIONS

Three Good Reasons Why FLAWSONIC Should be Your Pipeline Wall–Thickness Measurement Service; TDW Pipeline Surveys, vol. 88, Sep. 3, 1990.

Defect Location and Sizing in a Transmission Pipeline is No Easy Task, vol. 88, Aug. 20, 1990.

Pipeline Geometry Pigging: Application of Strapdown Ins, Todd R. Porter et al., 1990 IEEE, pp. 353–358.

British Gas Has Seamless Pipe Inspection Program, Lawrence Jackson et al., Technology, Sep. 9, 1987, Oil & Gas Journal, pp. 147–148, 150, 152, 155–156.

Canadian Operator Details Internal Inspection Program, Gary C. Robinson, Technology, Jun. 3, 1985, Oil & Gas Journal, pp. 55–59.

On–Line Measurement of the Microstructure and Mechanical Properties of Steel, J.F. Busiere, Materials Evaluation/ 44/Apr. 1986, pp. 560–567.

PCT/ISA/210 International Search Report, second sheet & continuation of second sheet, Jun. 17, 1999.

* cited by examiner

MAPPING SYSTEM FOR THE INTEGRATION AND GRAPHICAL DISPLAY OF PIPELINE INFORMATION THAT ENABLES AUTOMATED PIPELINE SURVEILLANCE

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates to a pipeline mapping system for comparing and graphically displaying integrated pipeline information without the need for ongoing, periodic aerial surveillance.

2. Description of the Related Art

Pipelines are widely used in a variety of industries and allow material to be transported from one location to another. A variety of fluids such as oil, gas, particulates, and other small solids suspended in fluids are transported using pipelines. In a typical application a pipeline carries a large quantity of oil products under pressure. Frequently, pipelines carry these products at high temperature and at high flow rates. Many pipelines are also routed through environments and carry products that affect the vitality of the pipeline. Environmental factors or transported products may result in, among other things, pipeline corrosion.

Pipeline corrosion, if not detected and remedied, can result in release of a pipeline's contents into a surrounding environment. Soil subsidence, local construction projects, seismic activity, weather, and degradation caused by normal use can also lead to defects and anomalies in a pipeline. In addition, harsh environments can cause pipelines to move gradually over time thus making later detection of buried pipelines difficult. These shifts in the pipeline location can also lead to defects, cracks, leaks, bumps, and other anomalies in the pipeline.

The internal and external surface walls of a pipeline are susceptible to damage by various factors. These factors may include: reactivity to the material flowing through the pipeline; pressure, temperature and chemical characteristics of various products and contaminants inside and outside the pipeline; corrosion; mechanical damage; fatigue; cracks; stress; distortion due to dents or wrinkles; exposure; and damage due to weight coating and free spanning of offshore pipelines. Moreover, submarine pipelines face additional hazards which include ship anchors, troll boards, and seabed scouring due to strong currents. While timely repair or maintenance of pipelines can lengthen the service lifetime of the pipeline, a rupture or serious leak within the pipeline can be difficult and expensive to repair. Further, in the early stages the exact position of the rupture may be difficult to locate.

The identification and location of defects and anomalies is crucial to pipeline maintenance. Identifying these faults in a buried pipeline is problematic when the location of the buried pipeline cannot be readily ascertained. As previously stated, many of the environmental stresses on the pipeline that cause defects and anomalies to appear in the pipeline can also shift the pipeline location. This is particularly true of very long pipelines.

Traditionally, pipeline operators have used various surveillance techniques to check for pipeline defects and encroachment. One such technique has involved aerial surveillance (utilizing an airplane or helicopter) to check for pipeline defects and encroachments. A disadvantage of aerial surveillance arises from its cost and concern for the safety of the persons performing the aerial surveillance. Another, less widely used surveillance technique has involved a person traversing a pipeline. The cost of this technique in terms of personnel and time is very high.

In addition to surveillance, traversing (or walking) a pipeline has also been used to locate or map the pipeline. When mapping a pipeline by traversing the pipeline route, a survey crew located the pipeline and took numerous global positioning system (GPS) readings along the pipeline route. These GPS coordinates were then stored for later display or visualization of the pipeline route. Again, pipeline survey crews were expensive and the task was time consuming.

Satellite and airborne imaging systems have also been utilized for various mapping tasks. Satellite imaging systems have been available for a number of years, but high resolution images have not been commercially available. High resolution images provided by such satellite imaging systems can provide information that can be useful in geographical mapping. One such satellite system with the capability of providing high resolution images is known as very high resolution (VHR) satellite imagery. VHR satellite imagery is scheduled to soon be available from a growing number of such satellites. The information contained within VHR satellite imagery is known to have a spatial resolution of approximately 1 meter.

Various geographic information system (GIS) software packages are commercially available for viewing images. One such package is IMAGINE®, a product of the Erdas Corporation based in Atlanta, Ga., which provides a Windows based image analysis and processing package. IMAGINE® provides for visual analysis of data and is capable of displaying, geo-correcting, and reprojecting that data.

Software packages that are directed to the presentation of pipeline inspection information are known and commercially available. One such package is PipeVision, a product of Pipeline Integrity International Ltd., assignee of the present invention. PipeVision presents existing pipeline inspection information in graphical and report formats.

SUMMARY OF THE INVENTION

The present invention provides a technique that utilizes pipeline data and satellite data for surveying or providing surveillance for a pipeline. The satellite data is integrated with the pipeline data to produce a current pipeline map. The current pipeline map can then be compared with a previous pipeline map to determine whether the route of the pipeline or a surrounding environment of the pipeline has changed. In a disclosed embodiment, the satellite data is very high resolution (VHR) satellite imagery and the pipeline data includes location data that is a series of global positioning system (GPS) coordinates.

Pipeline data from several sources, can also be integrated. The present invention provides for automated pipeline surveillance without requiring routine, periodic surveillance from an airplane or helicopter traversing the pipeline route. This reduces surveillance costs and alleviates safety concerns for those persons performing the aerial surveillance.

BRIEF DESCRIPTION OF THE DRAWINGS

A better understanding of the present invention can be obtained when the following detailed description of the preferred embodiment is considered in conjunction with the following drawings that are illustrative of an embodiment of the present invention, in which.

DETAILED DESCRIPTION OF PREFERRED EMBODIMENT

Figure 1:
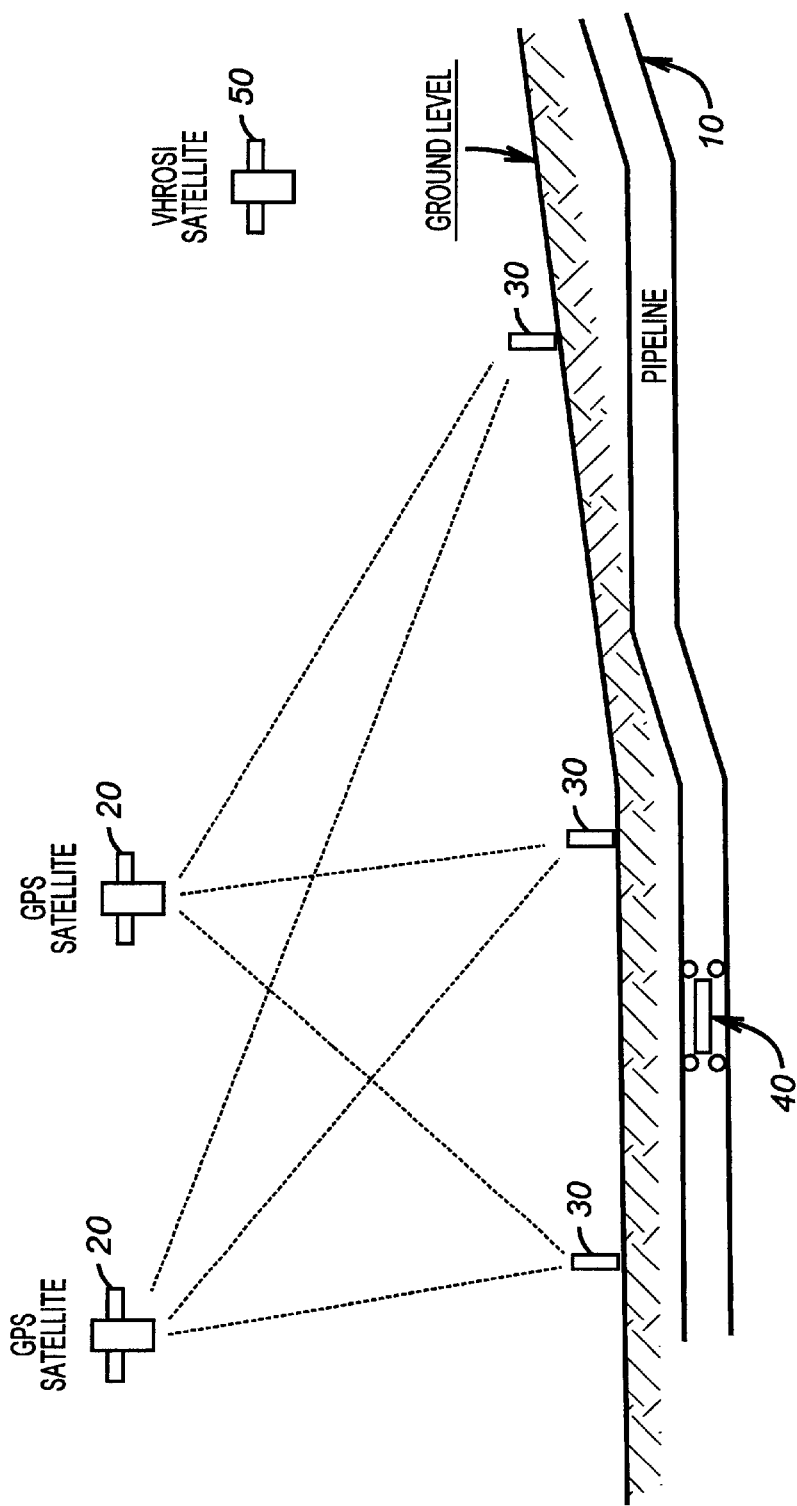
FIG. 1 illustrates a typical pipeline and the various apparatus that can be utilized in obtaining relevant pipeline data.

The present invention provides a pipeline mapping system implemented in a computer system that utilizes pipeline data and satellite data to provide automated surveillance for a pipeline. The satellite data is integrated with the pipeline data to produce a current pipeline map. The current pipeline map can then be compared with a previous pipeline map to determine whether the route of the pipeline or a surrounding environment of the pipeline has changed. In a disclosed embodiment, the satellite data is very high resolution (VHR) satellite imagery and the pipeline data includes location data that is a series of global positioning system (GPS) coordinates. The present invention provides for pipeline surveying or surveillance without requiring routine, periodic surveillance from an airplane or helicopter traversing the pipeline route. This reduces surveillance costs and alleviates safety concerns for those persons performing the aerial surveillance.

Pipeline Location Data

The preferred technique used to obtain location data along a pipeline for processing according to the present invention is initiated by inserting a mapping/inspection vehicle (MIV) within the pipeline. The MIV inspects the interior of the pipeline and maps the pipeline's location—that is the pipeline's curvature or profile. Such a MIV is typically integrated within a pipeline pig 40 (see FIG. 1). One example of a MIV for locating and evaluating a pipeline is entitled METHOD AND APPARATUS FOR DETERMINING LOCATION OF CHARACTERISTICS OF A PIPELINE, by Tuck, et al. U.S. application Ser. No. 08/996,504, filed Dec. 23, 1997, assigned to the assignee of the current invention which is hereby incorporated by reference.

In U.S. application Ser. No. 08/996,504, magloggers also known as "loggers" are used in combination with the MIV to map the pipeline. Magloggers 30 of this type are shown at spaced locations along the earth's surface near the pipeline 10. The magloggers 30 are located along the pipeline 10 to provide pipeline data used in post-processing routines. A given maglogger's location is determined through the use of differential GPS satellite techniques. The data from the particular maglogger 30 is then correlated to location data from the MIV in an analysis stage.

The magloggers 30 each contain a highly precise clock that is synchronized to a similar clock within the MIV in the pipeline pig 40. Using a fluxgate magnetometer and a recording device, each maglogger detects the approach of the MIV along the pipeline and detects the passage of the MIV by measuring the magnetic signature of the MIV passing through the pipeline. The exact time the MIV passes is stored within the maglogger with each data value being separately time-tagged.

Also, magnetic sensors within the MIV detect structural defects and anomalies within the pipeline as discrete events. The MIV also contains an inertial measurement unit (IMU) having both gyroscopic and accelerometer sensors. Further, the MIV includes an odometer for measuring the distance traveled by the MIV. The MIV's clock is also utilized to record the time at which an anomaly or defect is detected. The detection of defects and anomalies by the MIV can be translated to location not only in terms of an odometer reading, but also in terms of the distance to each maglogger. The gyroscope and accelerometer sensors within the IMU, in combination with the odometer and the loggers, provided the location of anomalies in terms of geographic position.

Figure 2:
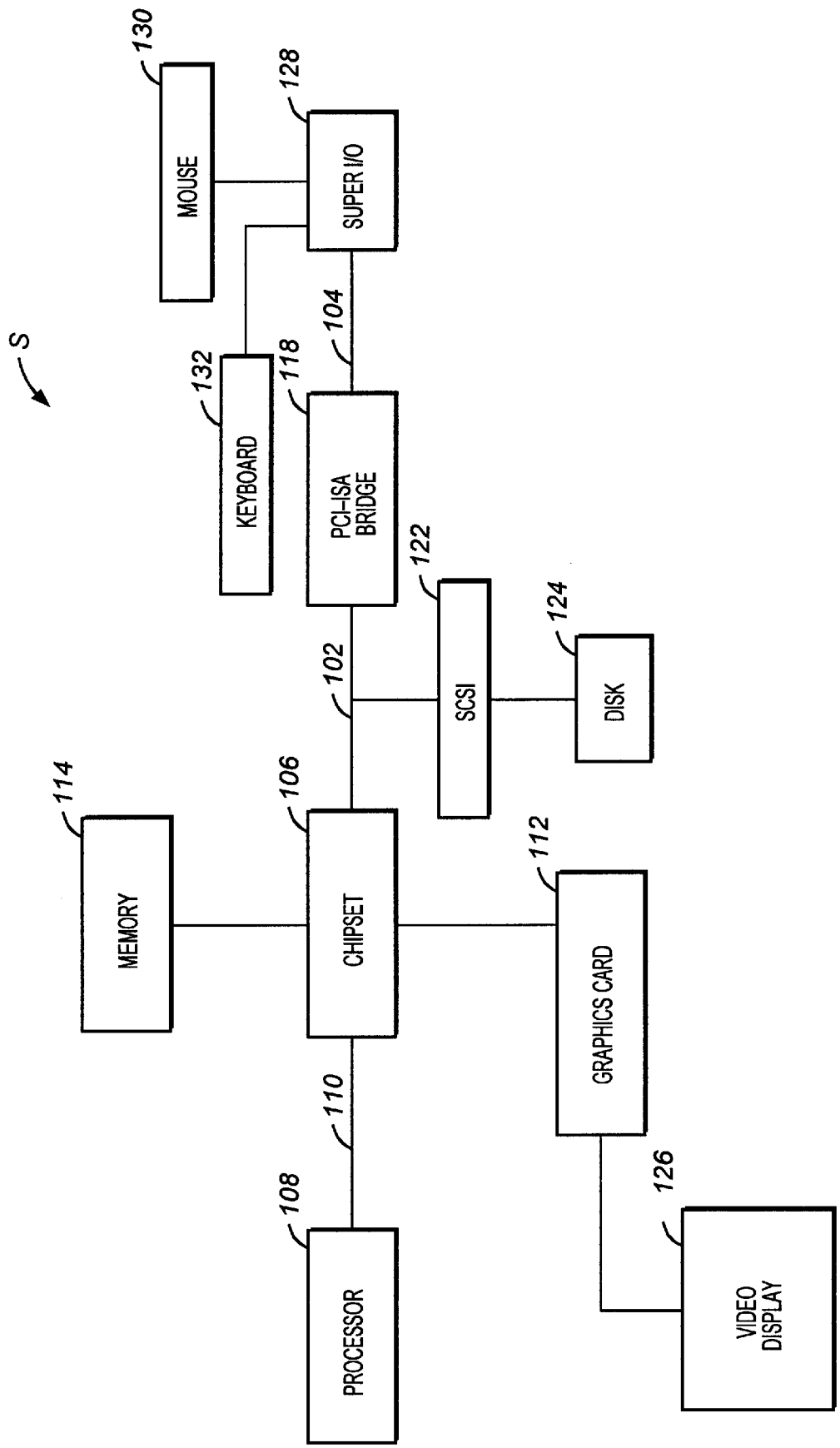
FIG. 2 illustrates a typical computer system S for implementing a pipeline mapping system according to the present invention.

After the pipeline data is obtained, the pipeline data is downloaded from the magloggers 30 and the MIV into a computer system (see FIG. 2). The post-processing software routines disclosed in U.S. application Ser. No. 08/996,504, also include a set of software processes for analyzing and correlating the pipeline data. Moreover, because the location of the logger is known in terrestrial coordinates such as longitude, latitude, and altitude (or other similar land measure) the location of any defect can be reported in such coordinates to avoid walking the pipeline. Through this technique repair teams can use differential GPS signals to locate defects with a high degree of accuracy. A repair team having a first GPS sensor at a known location can use signals received from the GPS satellites operated by the United States military to accurately locate a given point.

Primary Data

A pipeline map is primarily derived from pipeline location data and VHR satellite imagery. Pipeline location data can be provided by any method so long as the pipeline location data is either provided as or is convertible into a series of GPS coordinates. Various methods for obtaining the pipeline location data in GPS coordinates may be used, and the exact technique is not critical to the invention. Dwelling and transport (i.e., road and railroad) locations are provided by satellite imagery and can be utilized in the integration of the primary data. Turning to FIG. 1, the typical pipeline 10 is shown along with various apparatus that can be utilized in addition to the magloggers 30 to obtain relevant pipeline data. For example, using GPS satellites 20 to accurately locate magloggers 30 allows data from a MIV to be more readily integrated with data obtained from a VHR satellite 50. Integrating these various data obtained from those sources according to the pipeline mapping system of the present invention, allows for enhanced mapping of the pipeline 10. The pipeline mapping system utilizes various data sources and files. These data sources furnish the data they obtain as input to the pipeline mapping system. The pipeline mapping system manipulates the data sources and generates the output data which is the basis for a pipeline map.

The VHR satellite imagery from the satellite 50 is furnished in the form of raster files which contain satellite imagery of the area encompassing the pipeline 10 of interest. The amount and content of imagery data from satellite 50 depends on the ground coverage, spatial resolution, and number of bands provided by the VHR satellite imagery. A VHR satellite imagery providing a suitable sized ground coverage (such as an 11 kilometer×2 kilometer image in North America) is normally available to provide a reasonable corridor of ground cover on both sides of the pipeline 10.

Typical VHR satellite imagery formats include: 1 meter spatial resolution panchromatic, 4 meter spatial resolution multi-spectral, 1 meter spatial resolution pan-sharpened color containing three bands (the three bands are red, green, and blue (RGB)), and 1 meter spatial resolution pan-sharpened multi-spectral containing four bands (the four bands are RGB and near infrared (NIR)). As a general rule, either the 1 meter spatial resolution pan-sharpened three band product or four band product are adequate for generating pipeline maps. The primary difference between the three and four band products is the NIR band. The NIR band may be useful in locating and tracking the pipeline route in the satellite imagery under certain ground conditions.

VHR satellite imagery with a spatial resolution of 1 meter is also helpful in detecting and mapping individual dwellings, vehicles, and above ground pipeline related features such as compressor stations and pig trap compounds. The ability to identify dwellings and vehicles allows issues such as encroachment and excavation work in the vicinity of the pipeline to be automatically identified. Since VHR satellite imagery is scheduled to be available worldwide every three days, VHR satellite imagery, can among other things, provide data for monitoring pipelines for terrorist activity and third party damage. The ability to perform surveying or surveillance of a pipeline using the pipeline mapping system reduces the need for aerial surveillance. As previously stated, this allows a pipeline operator to reduce related monitoring costs. The infrared information contained within VHR satellite imagery is potentially useful for detecting methane related vegetation damage, which can be caused by pipeline leakage. The stereo VHR satellite imagery form allows terrain information, such as slope, to be determined.

In the preferred embodiment, the starting point is pipeline data available from the magloggers 30 or other sources as part of the standard pipeline logging and inspection procedures. That pipeline data includes records for each girthweld, offtake, logger, bend, and detected pipeline defect of the inspected pipeline 10. The records may include the following information about points of interest in the pipeline: weld number, relative distance, absolute distance, internal/external indicator, feature comment, percent defect, axial extent (mm), unknown, orientation, longitude (degrees), latitude (degrees), and altitude. The girthweld records are typically provided in a form including longitude and latitude values for their location.

Two feature types that are used if available within the pipeline mapping system of the present invention are girthweld and logger data. At times the pipeline inspection data may only contain GPS information for girthwelds. In this case, location information for other features would be derived by interpolation between girthwelds. The girthweld features may include: the weld number which indicates the girth weld sequence number, the absolute distance of the weld from the start of the inspected section of pipeline, and an indication that it is a girthweld. The longitude and latitude values represent the spatial location of the weld as determined from the IMU, as disclosed in U.S. application Ser. No. 08/996,504. For loggers the absolute distance indicates the distance of the logger from the start of the inspected section and the longitude and latitude give the logger's spatial location. The logger's weld field contains the weld number of the upstream girthweld.

Other features that are potentially useful for data correlation include large diameter offtakes and other discernable features that aid the data integration process. However, latitude and longitude coordinates are not typically available for these record types. As above, coordinates for these features are normally determined by interpolation between the upstream and downstream girthwelds using the relative distance measurements or calculations which show the distance of a feature from the upstream girthweld. For example, defects and any discernable pipeline feature can be included in the pipeline map if desired. Using the pipeline mapping system, detected defects and encroachments can be given real geographical location and displayed within a satellite image or strip map.

Computer System

Turning to FIG. 2, illustrated is a computer system S for mapping a pipeline according to an embodiment of the invention. While this system is illustrative of one embodiment, the techniques according to the invention can be implemented in a wide variety of systems, such as a mainframe or workstation. The computer system S in the illustrated embodiment is a personal computer in the form of a peripheral component interconnect (PCI) bus/industry standard architecture (ISA) bus based machine, having a PCI bus 102 and an ISA bus 104.

The PCI bus 102 couples a variety of devices that generally take advantage of a high speed data path. This includes a small computer system interface (SCSI) controller 122 for controlling a disk 124, which can be a compact disk-read only memory (CD-ROM). A chipset 106 provides a host-PCI bridge which couples the PCI bus 102 to a host bus 110 and a processor 108. The chipset 106 also provides a memory controller for controlling memory 114 and an accelerated graphics port (AGP) for connecting a graphics card 112. The memory 114 includes an application appropriate amount of dynamic random access memory (DRAM). A second bridge circuit, a PCI-ISA bridge 118 couples the PCI bus 102 to the ISA bus 104.

The chipset 106 can be a 440BX AGPset manufactured by the Intel Corporation. The PCI-ISA bridge 118 can be a PIIX4, also manufactured by the Intel Corporation. The PCI-ISA bridge 118 can include an internal enhanced intelligent drive electronic (IDE) controller for controlling up to four enhanced IDE drives (not shown), and a universal serial bus (USB) controller for controlling USB ports (not shown). The ISA bus 104 couples the PCI-ISA bridge 118 to a Super I/O chip 128, which can be a National Semiconductor Corporation PC87307VUL device. This Super I/O chip 128 provides a variety of input/output functionality, including a keyboard controller for a keyboard 132 and a mouse port for a mouse 130.

The processor 108 can be a Pentium II® processor. The Pentium II® processor could be replaced with different processors without detracting from the spirit of the invention. The processor 108 is capable of running any of a number of operating systems, such as Windows 95®, Windows NT®, or a Unix based operating system. Finally, a video display 126 is coupled to the graphics card 112 for display of graphics by the computer system S.

The computer system S is not critical to the present invention but should minimally include the capabilities of a systems that has: a 133 MHz Pentium® processor, 128 MB of DRAM, a seventeen inch video display with a 0.3 mm dot pitch, a super video graphics array (SVGA) video card with a 24 bit pixel depth, and a CD-ROM.

Secondary Data

Various secondary data can be displayed on a pipeline map (derived from the primary data) using the pipeline mapping system of the present invention. This secondary data includes other pipeline features as described below and enables a pipeline operator to display those pipeline features of interest. As previously mentioned, the pipeline mapping system can be adapted to provide geographical integration of other information which could include engineering strip maps and ground property maps (such as soil and geology).

Integrating this information can provide detailed digital maps of the pipeline and its proximity and provide information concerning habitation (i.e., population density) and transport (i.e., roads and railroads). This ability to integrate additional data provides the pipeline operator access to other potentially valuable pipeline data.

The ability to detect ground movement can provide valuable information in areas where mining subsidence and landslides are a primary threat to pipeline integrity. Data derived from synthetic aperture radar (SAR) imagery can be used to interpret ground movement and can potentially be integrated within a pipeline map. In addition, information derived from a number of new aircraft systems are relevant to pipeline management and can also potentially be integrated within a pipeline map. Laser systems which measure ground height to an accuracy of 5–10 cm are well suited to provide data concerning flood risk potential, subsidence, and landslip. Airborne spectrometers are available which gather very accurate properties of ground cover. This information is particularly suited to characterizing the chemical properties of soil (i.e., pH). Thermal sensors measure ground temperature and enable the detection of temperature anomalies. Available thermal sensors are very sensitive and typically produce data with temperature sensitivities of 0.1° C. Using these sensors, temperature and pH anomalies may be used to detect leakage along the pipeline 10.

Further, information concerning terrain properties such as elevation, slope, and land cover can be acquired. Land cover may include whether the ground cover is forest, arable, marshland, water, moor land, estuary land, covered by buildings or densely populated. Further, the information can potentially identify drainage, moisture content of the soil, the type of underlying soil, and the land's geological characteristics. This information can allow proposed route evaluations to be made in a much more cost-effective manner than conventional surveying. As previously stated, the pipeline mapping system can potentially be used to generate habitation density and transport density maps which could also be used by the pipeline operator for pipeline safety studies. A pipeline operator's defect database and information from recent inspection surveys can be combined with satellite image data, geology, soils, and drainage information. Satellite data can also be integrated with pipeline inspection data to produce high accuracy pipeline route maps for generating or updating stripmaps. Further, the pipeline mapping system can potentially integrate data on any pipeline feature of interest.

Integrating VHR satellite imagery with the pipeline mapping system may be helpful in identifying various features in the vicinity of the pipeline. This enables the pipeline mapping system to identify changes in surrounding features by comparing previous pipeline maps with current pipeline maps. In a similar manner, the pipeline mapping system can also compare stripmaps with air photos and/or satellite images from a number of dates and use this to ascertain whether changes have occurred. These detectable changes may include the presence of new construction, evidence of recent land slides, evidence of recent fires, or evidence of recent flooding. Whether the exact cause of the change can be identified is dependent on the resolution of the satellite image and the total area encompassing the change (i.e. size of the feature).

Pipeline inspection data can be from a previous or current inspection of the pipeline and could include information on cathodic protection (CP) locations, coating types, wall thickness, pipewall materials, and the location and scale of detected defects. Previous inspection information can also be compared with current inspection information. Whether the inspection data is held by the pipeline operator or the map service provider, the pipeline mapping system can import the inspection data (depending on the format) and annotate the pipeline map accordingly. This information can greatly improve a pipeline operator's understanding of the nature of defect distributions and the need for CP protection when correlated to the pipeline route.

Pipeline fixtures and fittings, such as valves and offtakes, are likely to be known to a pipeline operator or can be identified as part of a pipeline inspection. Enhancing the pipeline map with such information greatly improves the pipeline operator's ability to understand their pipeline map and pipeline. Readily accessible information on whether the ground in which the pipeline is laid is consolidated, wet, marshy, or otherwise can assist in pipeline integrity studies or in highlighting areas of concern. Classification of the land use may exist in a pipeline operator's databases or could be derived using image analysis techniques from the VHR satellite imagery.

Elevation data for the area surrounding the pipeline can be derived from multiple satellite images. Elevation data derived from the satellite imagery normally provides for a greater understanding of the pipeline and its environment. VHR satellite imagery in combination with information on land classification and soil condition may assist engineering judgements relating to potential integrity threatening events, such as land slippage. In its most basic form, this additional data can be provided as contours overlaid on the pipeline route and ground imagery. In a more complex form a digital elevation model (DEM) enabling 3D representation of the route of the pipeline can be implemented.

Functions Of The Mapping System

Figure 3:
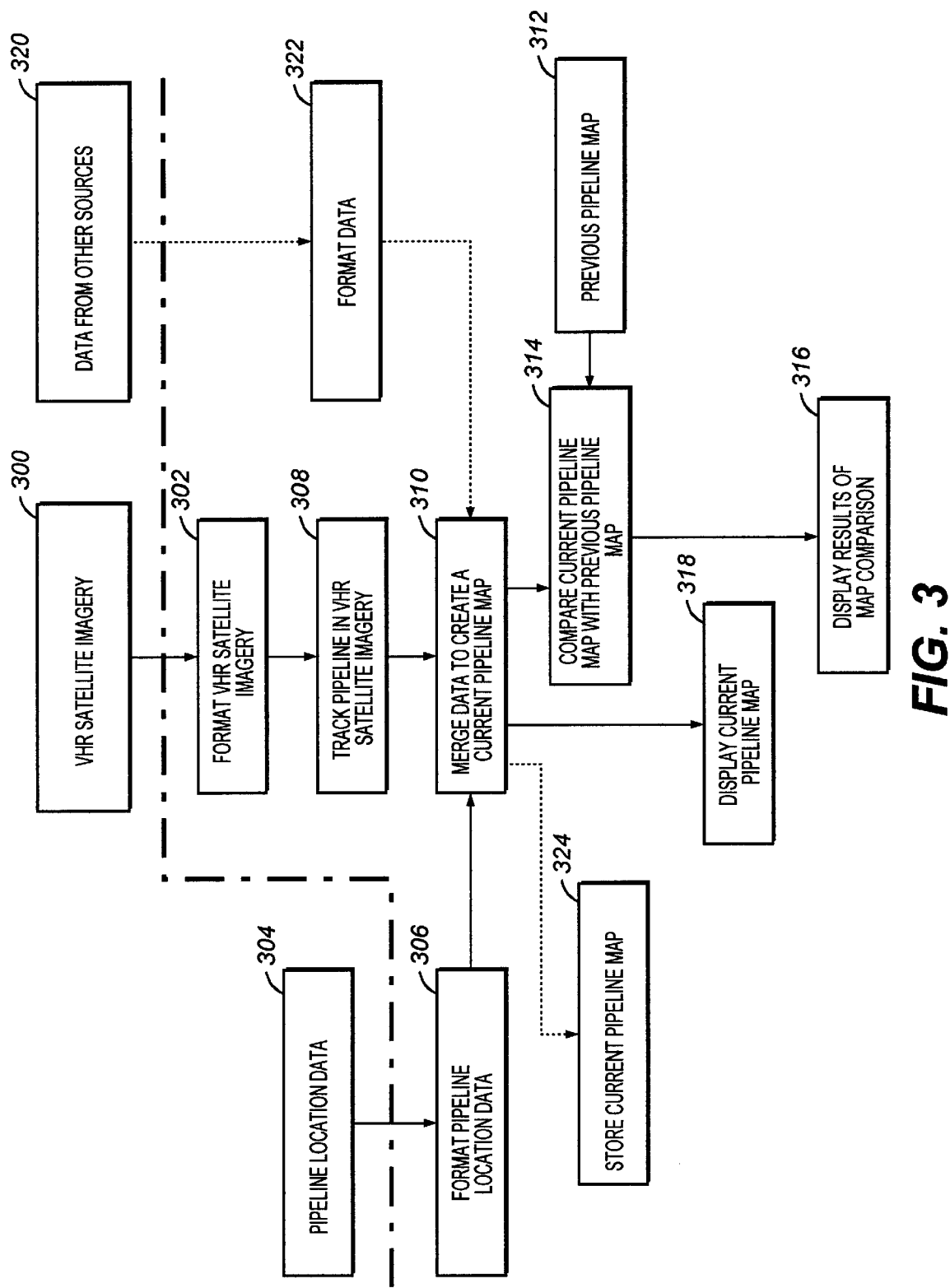
FIG. 3 is a block diagram depicting various functions performed by the pipeline mapping system according to the present invention.

FIG. 3 is a block diagram depicting various functions performed by the pipeline mapping system. In its basic form the pipeline mapping system imports VHR satellite imagery 300 and pipeline location data 304. The VHR satellite imagery 300 of the type described above is obtained from satellite 50, while the pipeline location data 304 comes from magloggers 30 and other sources described above. Other data sources 320 as indicated can also, where available, be integrated with the pipeline mapping system. The data sources 320 are the previously mentioned secondary data sources, such as aerial photograph imagery, compact airborn spectrometer instrument (CASI) imagery, thermal imagery, and soil and geology based data.

Upon input to the pipeline mapping system the pipeline location data and VHR satellite imagery is formatted, as required (see steps 302 and 306). The secondary data sources, when imported, are also formatted as required in step 322. The data formatting may also include editing the data. The pipeline mapping system functions to enable the user to process and modify the various data sources used in the generation of the satellite based maps prior to the final integration and mapping processes. Capabilities include: geo-referencing of VHR satellite imagery after import, color balancing of VHR satellite imagery, editing the raster values in VHR satellite imagery, conversion of coordinates from one map projection system to another, and editing various file data.

Figure 4:
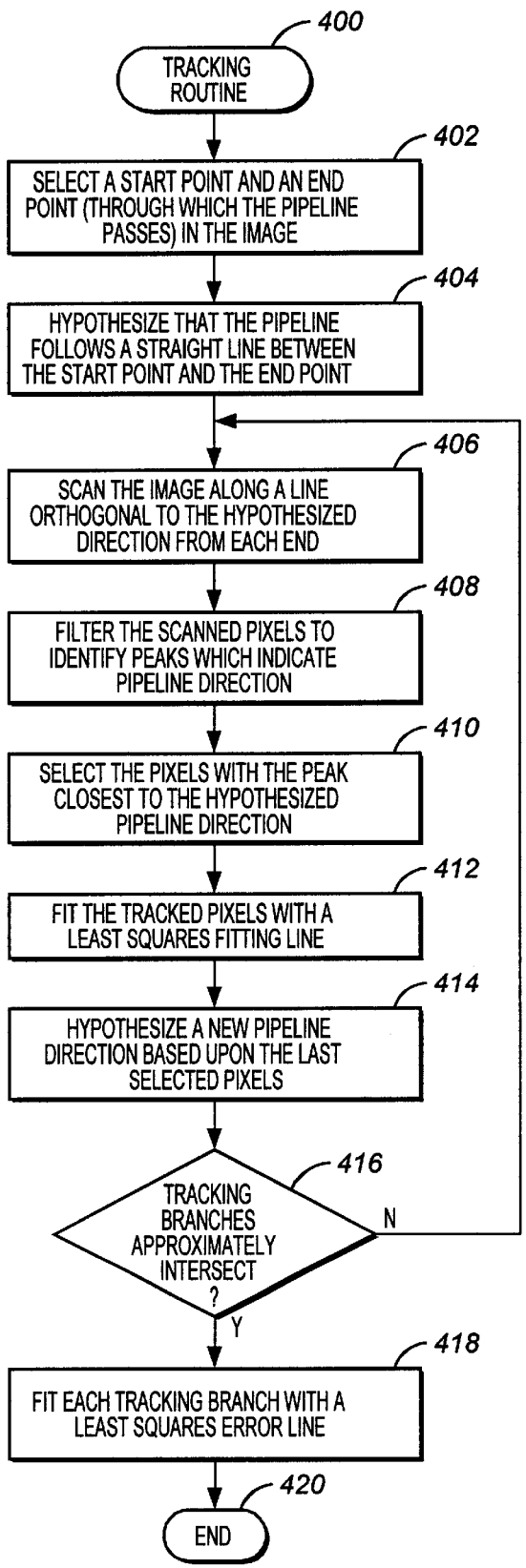
FIG. 4 is a flow chart associated with a pipeline tracking routine used in the present invention.

In step 308 the pipeline is tracked in the VHR satellite imagery (see FIG. 4). The pipeline mapping system tracks a pipeline and locate points where distinctive pipeline features can be detected in the satellite images. These points can then be used along with any visible or ascertainable GPS locations in the imagery (i.e., where loggers were located) to assist the integration of the imagery with the pipeline location data. The pipeline mapping system implements a mapping interface which allows tracking to be carried out interactively by the end user. This approach is proven and common within the seismic processing industry, where image based tracking is required along complex geological features.

The pipeline tracker is a tool that can be called upon when the VHR satellite imagery lacks sufficient GPS locations to enable the VHR imagery to be registered to the pipeline location data. When utilized the pipeline tracker provides a means of locating other GCPs that can then be used to register the VHR satellite imagery to the pipeline location data. In general, a GCP is any point in the VHR satellite imagery that can be mapped to a specific point along the route of the pipeline. For example, offtakes and bends in the pipeline may be located in the VHR satellite imagery. These points can then be used for registration of the VHR satellite imagery to the pipeline location data.

A disclosed embodiment of the pipeline tracker functions in three related parts. In the first part, a user locates a point in an image using a searcher. This is initiated by the user selecting a first point and a second point and then initiating the search. Using a tracking technique disclosed below the searcher finds the best indication of the pipeline between the first and second points. This process is repeated using two other points to generate another point in the imagery where the pipeline is detected. These two end points in the imagery, that are located using the searcher, are then used as seed locations for the second part of the process. These end points are detected using the tracking technique further discussed below. In the second part of the process, the pipeline tracker tracks the route between the two end points and displays the tracked route as an overlay on the satellite imagery. In the third part, a ground control point (GCP) on the tracked route can be selected and digitized for use in a later integration stage.

In another embodiment, the tracker is applied within a 10–20 meter corridor orthogonal to a known pipeline route. In this embodiment the tracker tracks from a launch point. As such there is no need to manually specify two points from which to start the process. The tracker works its way along the corridor identifying sections, which represent (to a high probability) the pipeline. In this manner, the tracker normally detects features that allow registration.

Which point to digitize is a matter of finding a corresponding identifiable feature in the satellite image. In a typical situation, such points are likely to be large diameter offtakes and large angle bends with a small rate of change (ROC). The method of choosing two points for the first step in the process may involve overlaying the imagery with the route of the pipeline to give a crude indication of where the pipeline and any identifiable pipeline features are likely to exist in the imagery. Once these are visually identified, searches and tracking can be targeted more precisely.

In step 310 the formatted data (306, 308, and possibly 322) is merged to create a current pipeline map. The process involves the transformation of the satellite imagery using ground control points (GCP) so that the pipeline route is located accurately within the image. The imagery is registered to the pipeline location data (rather than the other way round) since the pipeline location data is more accurate in terms of absolute location. The following description of the data integration is illustrative and other embodiments could be readily implemented based on the description herein.

The pipeline mapping system technique of integrating pipeline location data and VHR satellite imagery to produce a pipeline map strives to maximize both the relative accuracy between the pipeline route and surrounding ground imagery and the absolute accuracy of all points in the pipeline map. The pipeline route is positioned with respect to ground features and absolute geographic position to maximize accuracy. The pipeline mapping system accommodates a number of potential scenarios, in terms of the available information, in the integration process. The following scenarios are applicable when pipeline data is obtained using the prior art MIV vehicle of U.S. application Ser. No. 09/996,504.

In a first scenario the maglogger locations are visible in the VHR satellite imagery and located at regular intervals along the length of the pipeline from launch to receive point. If the magloggers are located at above ground installations (AGIs), then the likelihood is that the AGIs are visible and the position of a maglogger is identifiable as that of the AGI to within several pixels accuracy (approximately 2 meters). Using the AGIs to fix the location data within the VHR satellite imagery results in a pipeline map having minimum absolute errors. Magloggers spaced at 7 kilometer lineage points, where the point of placement within the AGI is clearly identifiable in the imagery should produce absolute errors of no more than 4 meters at mid-lineage points. The accuracy of the pipeline map can potentially be improved if segments of the pipeline route between AGIs are resolvable in the VHR satellite imagery, using either automated or manual techniques.

In a second scenario the maglogger locations are located at featureless points along the pipeline and therefore are not identifiable in the VHR satellite imagery. The accuracy in the pipeline map then depends on the spread of detectable sections of the pipeline in the satellite imagery. The detectable sections of the pipeline, whether detected using automated or manual techniques, when combined with potential changes in the direction of the pipeline should assist the integration of the pipeline location data (particularly if magloggers are deployed at launch and receive pig traps). However, because of the difficulty of fixing points errors are likely to be greater than in the first scenario. These errors should be no worse than the previously stated accuracy of the VHR satellite imagery which is +/−10 meters.

In a third scenario maglogger locations are not identifiable in the VHR satellite imagery and the pipeline route cannot be resolved in the imagery. In this scenario, the pipeline location data and VHR satellite imagery are integrated using only geographic coordinates. If the imagery has an accuracy of +/−10 meters and the accuracy of the pipeline location data is approximately +/−2 meters (assuming the deployment of magloggers approximately every 7 kilometers), then the absolute accuracy of the pipeline should be no worse than +/−12 meters.

In practice, it is unlikely that any one scenario would be applicable to an entire pipeline. Therefore, the accuracy along the length of the pipeline will normally vary depending on the circumstances of a given section. As a general rule, satellite images that identify maglogger locations for a particular pipeline section aid in the reduction of errors in adjacent pipeline sections where maglogger locations cannot be identified.

Using the tracking techniques further described below allows a pipeline operator to register the VHR satellite imagery to the pipe location data, even when the pipeline route is not visible to the naked eye. The disclosed tracking technique can be implemented regardless of how the GPS coordinates for the pipeline were obtained and improves the accuracy of the VHR satellite imagery to approximately that of the GPS data at GPS coordinate locations. Registering the VHR satellite imagery to GPS pipeline location information allows the error in all of the three above scenarios to be reduced to approximately +/−2 meters.

The current pipeline map represents the most recent version of the status of the pipeline 10 along its length. The current pipeline map can be stored as shown in step 324. The current pipeline map can also be displayed as shown in step 318 or compared with a previous pipeline map 312 as shown in step 314. The ability to view a pipeline map normally needs to be available to both a pipeline map service provider and a pipeline operator. The ability to display a pipeline map on the screen with associated coordinates (Longitude/Latitude, Eastings/Northings, etc.) and allow a user to inquire about the geographic location of certain features visible in the displayed image is desirable.

To enable efficient viewing of the pipeline route, the pipeline mapping system provides for, among other things, scrolling, panning, jumping to areas of interest, zooming in, and zooming out. When other data sources (e.g. soil maps) are included these data sources are displayed as overlays to the pipeline map, and therefore need associated geo-coordinates. The pipeline mapping system can provide for switching data layers on and off, and allow inquiries by the user with respect to relevant additional data sources. For example, the user could request that the pipeline mapping system identify areas of high soil corrosivity along the pipeline route. The previous pipeline map 312 can be derived from any prior stored current pipeline map. The results of the comparison can be displayed as shown in step 316.

Tracking Techniques

The presence of an underground structure such as a pipeline can affect the moisture patterns and vegetation growth in the surrounding terrain. In VHR satellite imagery buried structures typically manifest themselves as faint patterns on the ground. The ability to identify such pipeline features is desirable as it allows pipeline surveillance techniques to be automated. Identifying buried structures in the VHR satellite imagery presents a difficult problem from the fact that the features that one wishes to identify are very subtle and they do not always manifest themselves as contrast edges or lines. Due to the faint ground patterns created by a buried pipeline, it is very difficult to identify the structure using conventional edge and line detection methods.

One approach that aids in the interpretation of the images is the use of nonlinear filters. Nonlinear filters typically have better signal-to-noise characteristics than linear filters. A disadvantage of nonlinear filters is that they produce noisy outputs such that the identification of a true signal among a number of false maxima is difficult to ascertain in an automatic way. This is one reason that nonlinear filters have normally be used within the framework of a model-driven approach. In a model-driven approach one has some prior knowledge of the position of the edge and the maximum of the filter response is searched within a pre-specified range. Since a pipeline operator is typically interested in a particular section of a pipeline, it is possible to implement the tracker in a semi-automatic way.

This allows a pipeline operator's a priori knowledge to be incorporated in the tracking process. Faint edges manifest themselves as the maxima of the absolute value of the first derivative of a signal. Faint lines manifest themselves as maxima of the second derivative of a signal. Faint edges are usually enhanced and detected using differentiating filters. Faint lines are enhanced and identified using filters that estimate the second derivative. As a general rule, the best results in terms of correct identification of the location of a linear feature and robustness to overground linear structures like roads and hedges is achieved with a median, mode or trimmed contraharmonic mean filter applied to a green or a red band of an image. Formulas for the $L_p$ mean filter and contraharmonic filter are illustrated below:

$L_p$ mean:

$$\sqrt[p]{\frac{\sum_{i=1}^{N} a(i) x_i^p}{\sum_{i=1}^{N} a(i)}}$$

Contraharmonic mean:

$$\frac{\sum_{i=1}^{N} x_i^{p+1}}{\sum_{i=1}^{N} x_i^p}$$

The trimmed contraharmonic filter is defined as follows: where the summation is over all the pixels in a panel of a triptych window, I(i,j) the discrete brightness levels of pixel (i,j), and 'p' is a free parameter. For the $L_p$ mean filter setting 'a(i)' equal to one and 'p' equal to five typically provides good results. For the contraharmonic mean filter setting 'p' equal to two typically provides good results. A trimmed contraharmonic filter is denominated as such because the summation is performed only for those pixel values within one standard deviation from the mean value. A Gaussian filter can be utilized with the trimmed contraharmonic filter to remove noise from the signal.

Utilizing a tracker in this manner assumes that a pipeline operator can ascertain two points in an image section through which a linear feature (such as a pipeline) passes. Initially, the tracker hypothesizes that the feature follows the direction of a straight line that passes through these two points. The tracker starts from both ends of the line segment and scans the image along a line orthogonal to the hypothesized direction of the feature. Along all pixels of the scan line the output of the trimmed contraharmonic filter is computed and assigned to the central pixel. Due to noise several peaks may be identified in a filter's output along a single line of scanning. For each one of the first few points of tracking the peak which is closest to the assumed direction is picked. From the identification of the first few tracked points the tracker calculates a new updated version of the linear feature orientation treating the two ends independently. The tracker then fits each of the two sets of tracked points at the ends of the original hypothesized position of the feature with a least squares fitting line.

To avoid the interference of outliers the tracker, in the preferred embodiment, uses the Ransac method for robust fitting as described below. If 'P' denotes the set of points that we want to fit with a straight line, the algorithm is the following: Select two points from 'P' randomly and determine the line 'L' between them. For every point in 'P' compute its distance to the line 'L', and then determine the subset 'S' (consensus set) consisting of the points with distances less than a certain threshold 'E' (error tolerance). If the number of points in the consensus set 'S' is greater is greater than a given threshold, compute the line that fits set 'S', using the least square error method. Otherwise, repeat the above process until you find an appropriate consensus set 'S' or fail after a desired number of times. If no "good" set was found, select the largest consensus set found and compute the line using it.

The tracker then proceeds by scanning the image from each end perpendicularly to the new hypothesized direction of the pipeline. These line segments or branches approximately intersect at some point between the end points. The tracker allows the pipeline to have up to a single change of direction between two end points that are fixed and known a priori. The tracker proceeds by tracking a few points, fitting with the tracked points with a least square error line, updating the orientations of tracking, and tracking again. Tracking stops when the intersection point to any two tracking directions coincide or is very close to one of the tracked points. At the end, each branch of the tracked feature is fitted with a least squares error line.

As a general rule, the tracker can deal with the presence of strong edges crossing the pipeline or edges which are parallel to the structure and appear close to it (such as roads and railroads). The presence of these lines can influence the tracker if they appear very close to the initial selected end points, because they usually introduce noisy points in the tracking sequence. However, once the tracker has computed a reasonable number of points, the presence of some noisy points can be easily resolved with the use of a robust fitting method (preferably the Ransac method). In addition, the pipeline operator can influence the tracking process by not picking end points in close proximity to such structures.

To reiterate, the tracker provides a semi-automatic method for tracking faint linear ground features (such as buried pipelines). The technique is driven by a user selecting end points where the pipeline is detectable. The tracker subsequently tracks the feature for all points between the selected end points. The tracker makes the assumption that there is at most one change of direction in the features between the two selected end points. An advantage of the tracker is that it can identify the position of a pipeline in an image where it is not visible to the naked eye. For detection, a pipelines pixels must exhibit some detectable difference from surrounding environmental pixels of the VHR satellite imagery.

This allows the satellite image to be accurately integrated with GPS pipeline location data, maintaining the accuracy of the GPS pipeline location data. This in turn allows a user to create accurate pipeline maps that can be stored for comparison to later acquired satellite images of the same pipeline section. Comparing previous pipeline maps to current pipeline maps, using standard image analysis techniques, allows a user to perform surveillance of the pipeline automatically reducing the need for aerial surveillance.

Pipeline Tracking from Satellite Data

Turning to FIG. 4, a tracking routine 400 is illustrated. The tracking routine 400 implements step 308 of FIG. 3. In step 402 a pipeline operator selects two points in the image where portions of a pipeline are detectable. The end points should be selected such that there is only one change of direction between end points. The tracker functions by moving a sequence of triptych windows along a straight search line between the selected points. A triptych window is composed of three panels: top, central, and bottom. The panel length of the triptych window affects the nonlinear filter's response. Since the goal is to obtain just one filter peak (minima or maxima depending on the filter) the length of the central panel must span, at a minimum, the pixel width of the pipeline. The optimal panel length is dependent on the pixel width of the pipeline section that is tracked (the width is dependent on the resolution of the satellite image). For a typical 1 meter resolution pipeline image, a panel length of 15 pixels and a panel width of 21 pixels provides good tracking results.

When ground conditions are favorable (that is—several days after rain in the area of interest), the point where a pipeline passes orthogonal to the search line can be located using this technique. The route of the pipeline is tracked by moving the search windows inward from two end points and applying robust regression to smooth the obtained indications. As previously stated, this technique is functional even when a section of pipeline includes a change in direction due to a bend.

In step 404, the tracker utilizes these end points to hypothesize a route (in the preferred embodiment-a straight line) between the end points. The tracker only aids in the registration process when it detects a change in direction in the pipeline. That is, without a change in direction there is no discernable feature that can be used as a GCP. In step 406 the routine 400 scans the image along a line orthogonal to the hypothesized route. In step 408 the scanned pixels are filtered, using one of the previously mentioned nonlinear filters to reduce noise. In step 410, the routine 400 selects the pixels with peaks closest to the hypothesized route. In step 412 the tracked pixels are adjusted using a least squares fitting line (preferably the Ransac method).

The number of pixels to compute before tracking a new direction is an important parameter. Updating the tracking direction after determining ten points provides good results for a typical pipeline. In step 414 a new pipeline route is hypothesized based upon the selected pixels at which point control passes to step 416. In step 416 control passes to step 418 if the tracked branches approximately intersect. Otherwise, control passes to step 406. In step 418 each tracked branch is fitted using a least squares error line before the routine 400 ends in step 420.

Operation

As previously discussed, pipeline location data for a pipeline can be obtained in GPS coordinates through various techniques. For example, pipeline location data can be captured for the entire route of the pipeline either as part of an inspection or as a standalone run of the IMU disclosed in U.S. application Ser. No. 08/996,504. In any case, the obtained location data consists of data at discrete points down the entire length of the pipeline. These points serve to identify the overall route of the pipeline. The location data captured by the IMU disclosed in U.S. application Ser. No. 08/996,504, consists of longitudes and latitudes in the WGS84 frame, along with altitude information referenced to some base datum (e.g. sea level). The IMU can also provide an odometer reading showing the lineage from the start of the inspection for each set of coordinates. For the purpose of showing a plan route of the pipeline the only data of relevance are the longitude and latitude coordinates, though the altitude information could be used in three dimensional (3D) representations of the pipeline route. In this situation a digital elevation model (DEM) would normally be used as the basis for developing the 3D visualization.

The resolution of the location data from the IMU, disclosed in U.S. application Ser. No. 08/996,504, is effectively the inter-scan frequency of the IMU. Although, the MIV is capable of providing location data every 10 centimeters down the length of the pipeline, in a typical application, data no more frequent than 1 meter will be used, and it may be that data at every girth weld (approximately every 12.5 m) is sufficient to meet a client's needs. This is primarily dependent on the needs of the pipeline operator and how the pipeline operator wants to represent the pipeline. As should be apparent, the frequency of the pipeline data will affect the speed with which the pipeline route can be displayed.

The accuracy of the data provided by the IMU is highly dependent on the frequency with which magloggers are deployed along the route of the pipeline. At maglogger locations differential GPS readings are taken and used to reset the drift that naturally occurs within the longitude and latitude readings of the IMU. At maglogger locations the accuracy of the IMU location data is therefore limited by the accuracy of the GPS used. Between adjacent magloggers the drift effect of the IMU introduces errors, which are a maximum at the mid-lineage point. The size of these errors essentially depends on the lineage between the maglogger locations. As the distance is increased the error increases. With magloggers spaced at 7 km the stated accuracy of the IMU, disclosed in U.S. application Ser. No. 08/996,504, is 1.5 meters rms. At any point along the pipeline route the stated accuracy of that point is within 1.5 meters of its true location.

The location coordinates of logger points can typically be said to have the accuracy of the GPS used to survey the logger locations. In the case of differential GPS, this accuracy is approximately 0.2 meter. At other locations, the accuracy of the location data is dependent on the spacing of the GPS loggers used to recalibrate the IMU data. The greatest inaccuracy (or uncertainty) occurs at mid-logger locations. Typically, the uncertainty is sinusoidal in nature with a maximum of approximately 3 meters at mid-logger locations and zero uncertainty at logger locations.

The ground spatial resolution of the satellite imagery is estimated to be approximately 1 m for panchromatic, and 4 m for multi-spectral. Some products may be available which have both data types fused to produce pan-sharpened imagery having a spatial resolution of 1 m, but including multi-spectral band data. The accuracy of such data is dependent on the particular product used, but could be as low as 12 meters. In most circumstances, the accuracy of the satellite data may be improved to approximately 2 meters using pipeline route GPS information. This accuracy allows for automated surveying or surveillance obviating the need for aerial reconnaissance.

In practice, the satellite based pipeline map of an inspected pipeline can only be as accurate as the base data sources used to produce it. The data sources must be integrated so as to retain the inherent accuracy of the location data provided by the IMU, or other GPS data source, while ensuring that features present in both data sources are matched. The accuracy requirements of the pipeline mapping system are pipeline operator dependent. In the some situations, satellite imagery accurate to within 10 meters is adequate.

If VHR satellite imagery scenes for a pipeline are available before deploying the MIV the pipeline route can be 'previewed' visually. This enables areas where the pipeline is not visible in the imagery to be identified; thus assisting the effective deployment of magloggers to minimize errors during the integration of the location data with the satellite imagery.

The foregoing disclosure and description of the invention are illustrative and explanatory thereof, and various changes in the details of the illustrated apparatus and construction and method of operation may be made without departing from the spirit of the invention.

What is claimed is:

1. A method of providing surveillance for a pipeline, comprising the steps of:
   tracking a linear section of a pipeline in satellite data using existing pipeline data, the existing pipeline data comprising pipeline location data;
   registering the satellite data to the pipeline location data, retaining the accuracy of the pipeline location data;
   merging the satellite data with the existing pipeline data to form a current map of the section of the pipeline; and
   comparing the current map with a previous map of the pipeline to detect relative changes between them.

2. The method of claim 1, wherein the satellite data provides ground features comprising roads, railroads, dwellings, vehicles, valve stations, and maglogger locations.

3. The method of claim 1, further comprising the steps of:
   integrating client data as overlays on the current map.

4. The method of claim 3, wherein the client data comprises pipeline inspection data, pipeline fixture data, pipeline fitting data, soil condition data, land class data, and land elevation data.

5. The method of claim 1, wherein the pipeline location data is a series of GPS coordinates.

6. The method of claim 1, wherein the registering step includes the step of:
   capturing a ground control point (GCP) in the satellite data, wherein the GCP is utilized to facilitate merging of the satellite data and the pipeline location data.

7. The method of claim 1, wherein the registering step is performed using a resample method and an integration method.

8. The method of claim 1, wherein the tracking step further comprises the steps of:
   (a) selecting two end points in the satellite image, wherein each of the two end points correspond to a tracking branch of the pipeline;
   (b) scanning pixels of the satellite image along a line orthogonal to a straight line between the two end points, wherein the pixels are scanned from both of the end points;
   (c) filtering the scanned pixels using a non-linear filter to identify peaks which indicate a route of the pipeline;
   (d) selecting the scanned pixels with a peak closest to the straight line between the two end points;
   (e) fitting the selected pixels with a least squares fitting line utilizing a robust fitting method;
   (f) setting the two end points to the location of the last selected pixel for each of the tracking branches and repeating steps (b) through (f) until the tracking branches approximately intersect; and
   (g) fitting the tracking branches with a least squares error line utilizing the robust fitting method.

9. The method of claim 8, wherein the selection of the two end points in step (a) is performed manually.

10. The method of claim 1, wherein the satellite data is VHR satellite imagery.

11. The method of claim 1, wherein the comparison step is automated using standard image analysis techniques.

12. A computer system that provides for surveillance of a pipeline, the computer system comprising:
    a processor;
    a video display system coupled to the processor;
    a mass storage device coupled to the processor; and
    pipeline mapping code in a processor readable medium for causing the processor to perform the steps of:
       tracking a linear section of a pipeline in satellite data using existing pipeline data, the existing pipeline data comprising pipeline location data;
       registering the satellite data to the pipeline location data, retaining the accuracy of the pipeline location data;
       merging the satellite data with the existing pipeline data to form a current map of the section of the pipeline; and
       comparing the current map with a previous map of the pipeline to detect relative changes between them.

13. The computer system of claim 12, wherein the satellite data provides ground features comprising roads, railroads, dwellings, vehicles, valve stations, and maglogger locations.

14. The computer system of claim 12, the pipeline mapping code further comprising code for causing the processor to perform the step of:
    integrating client data as overlays on the current map.

15. The computer system of claim 14, wherein the client data comprises pipeline inspection data, pipeline fixture data, pipeline fitting data, soil condition data, land class data, and land elevation data.

16. The computer system of claim 12, wherein the pipeline location data is a series of GPS coordinates.

17. The computer system of claim 12, wherein the registering step includes the step of:

capturing a ground control point (GCP) in the satellite data, wherein the GCP is utilized to facilitate merging of the satellite data and the pipeline data.

18. The method of claim 12, wherein the registering step is performed using a resample method and an integration method.

19. The computer system of claim 12, wherein the tracking step further comprises the steps of:

(a) selecting two end points in the satellite image, wherein each of the two end points correspond to a tracking branch of the pipeline;

(b) scanning pixels of the satellite image along a line orthogonal to a straight line between the two end points, wherein the pixels are scanned from both of the end points;

(c) filtering the scanned pixels using a non-linear filter to identify peaks which indicate a route of the pipeline;

(d) selecting the scanned pixels with a peak closest to the straight line between the two end points;

(e) fitting the selected pixels with a least squares fitting line utilizing a robust fitting method;

(f) setting the two end points to the location of the last selected pixel for each of the tracking branches and repeating steps (b) through (f) until the tracking branches approximately intersect; and (g) fitting the tracking branches with a least squares error line utilizing the robust fitting method.

20. The computer system of claim 19, wherein the selection of the two end points in step (a) is performed manually.

21. The computer system of claim 12, wherein the satellite data is VHR satellite imagery.

22. The computer system of claim 12, wherein the comparison step is automated using standard image analysis techniques.

23. A method of tracking a linear feature in a digital image, the method comprising the steps of:

(a) selecting two end points in the digital image, wherein each of the two end points correspond to a tracking branch of the feature;

(b) scanning pixels of the digital image along a line orthogonal to a straight line between the two end points, wherein the pixels are scanned from both of the end points;

(c) filtering the scanned pixels using a non-linear filter to identify peaks which indicate a route of the feature;

(d) selecting the scanned pixels with a peak closest to the straight line between the two end points;

(e) fitting the selected pixels with a least squares fitting line utilizing a robust method;

(f) setting the two end points to the location of the last selected pixel for each of the tracking branches and repeating steps (b) through (f) until the tracking branches approximately intersect; and (g) fitting the tracking branches with a least squares error line utilizing the robust method.

24. The method of claim 23, wherein the nonlinear filter is a trimmed contraharmonic filter and Ransac is the robust method utilized.

* * * * *